(12) United States Patent
Miller II et al.

(10) Patent No.: US 6,973,122 B1
(45) Date of Patent: Dec. 6, 2005

(54) POWER ALLOCATION SCHEME FOR DMT-BASED MODEMS EMPLOYING SIMPLEX TRANSMISSION

(75) Inventors: Robert Raymond Miller II, Morris Township, NJ (US); Ranjan V. Sonalkar, North Caldwell, NJ (US)

(73) Assignee: AT&T Corp., New York, NY (US)

( * ) Notice: Subject to any disclaimer, the term of this patent is extended or adjusted under 35 U.S.C. 154(b) by 872 days.

(21) Appl. No.: 09/771,181

(22) Filed: Jan. 26, 2001

(51) Int. Cl.[7] ................................................ H04B 1/38
(52) U.S. Cl. ...................................................... 375/222
(58) Field of Search ............................... 455/12.1, 450, 455/451, 452.1, 452.2, 453, 454; 375/240, 375/222; 370/477

(56) References Cited

U.S. PATENT DOCUMENTS

| | | | | |
|---|---|---|---|---|
| 5,852,633 A | * | 12/1998 | Levin et al. ................. | 375/130 |
| 6,134,274 A | * | 10/2000 | Sankaranarayanan et al. ... | 375/295 |
| 6,275,522 B1 | * | 8/2001 | Johnson et al. .............. | 375/224 |
| 6,285,708 B1 | * | 9/2001 | Shively et al. ............... | 375/222 |
| 6,292,559 B1 | * | 9/2001 | Gaikwad et al. ............. | 379/417 |
| 6,400,773 B1 | * | 6/2002 | Krongold et al. ............ | 375/260 |
| 6,418,161 B1 | * | 7/2002 | Shively et al. ............... | 375/222 |
| 6,456,657 B1 | * | 9/2002 | Yeap et al. ............. | 375/240.12 |

OTHER PUBLICATIONS

Kalet, Irving, "The Multitone Channel," *IEEE Transactions on Communications*, vol. 37, No. 2, pp. 119-124, Feb. 1989.

* cited by examiner

*Primary Examiner*—Mohammed Ghayour
*Assistant Examiner*—Pankaj Kumar

(57) ABSTRACT

The present invention provides a method, apparatus and computer readable medium for allocation of an available power to Discrete Multi-Tone (DMT) frequency tones in a DMT-based Digital Subscriber Line (DSL) modem. In one embodiment, the method includes the steps of: initializing the DMT-based DSL modem by calculating aggregate values of channel attenuation, noise power, and power mask; pre-filtering to flag noisy bins that are unable to support a minimum number of bits with the maximum power available for transmission in a bin; and using a repeated-bisection splitting scheme to allocate the available power substantially optimally among a plurality of bands for DMT frequency tones.

25 Claims, 4 Drawing Sheets

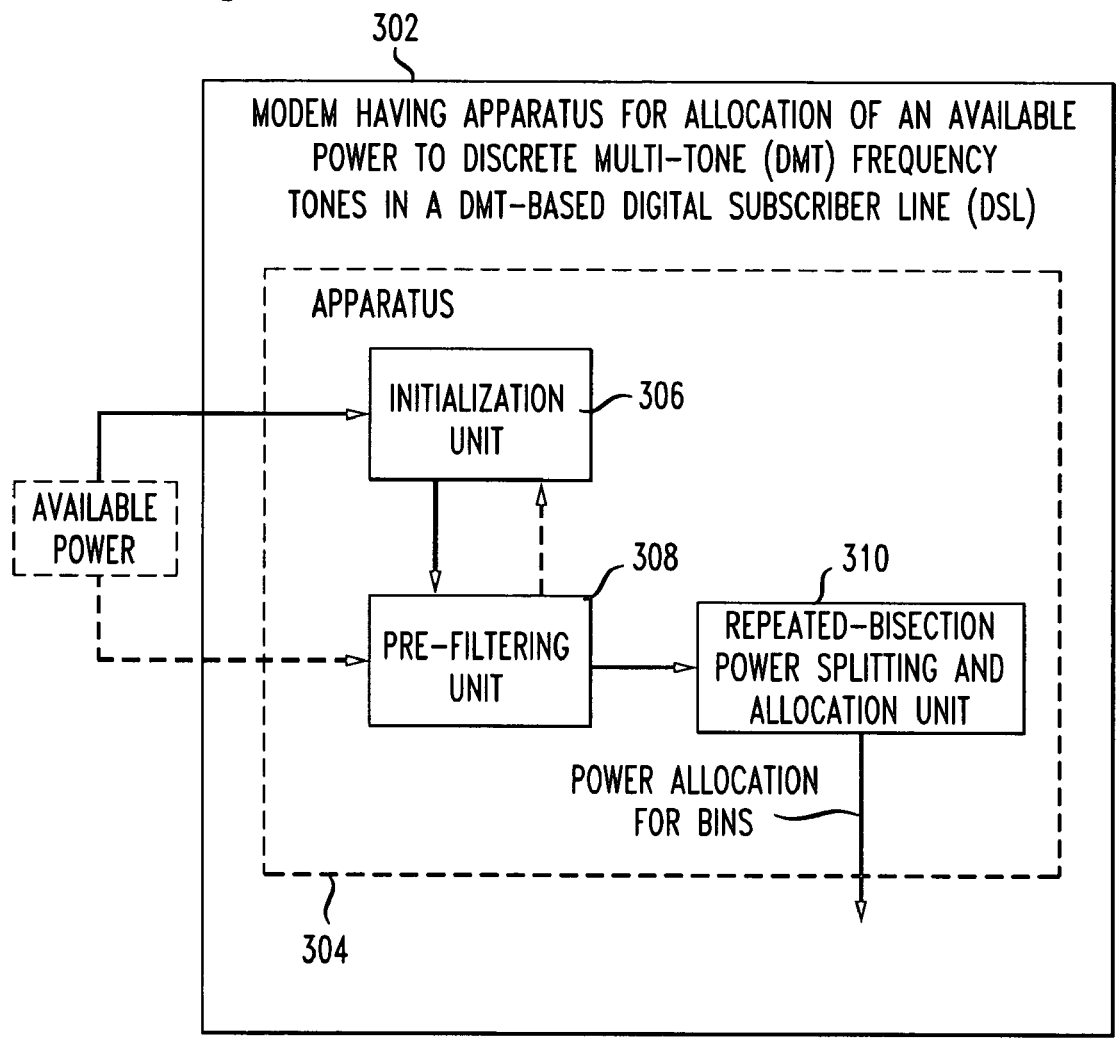

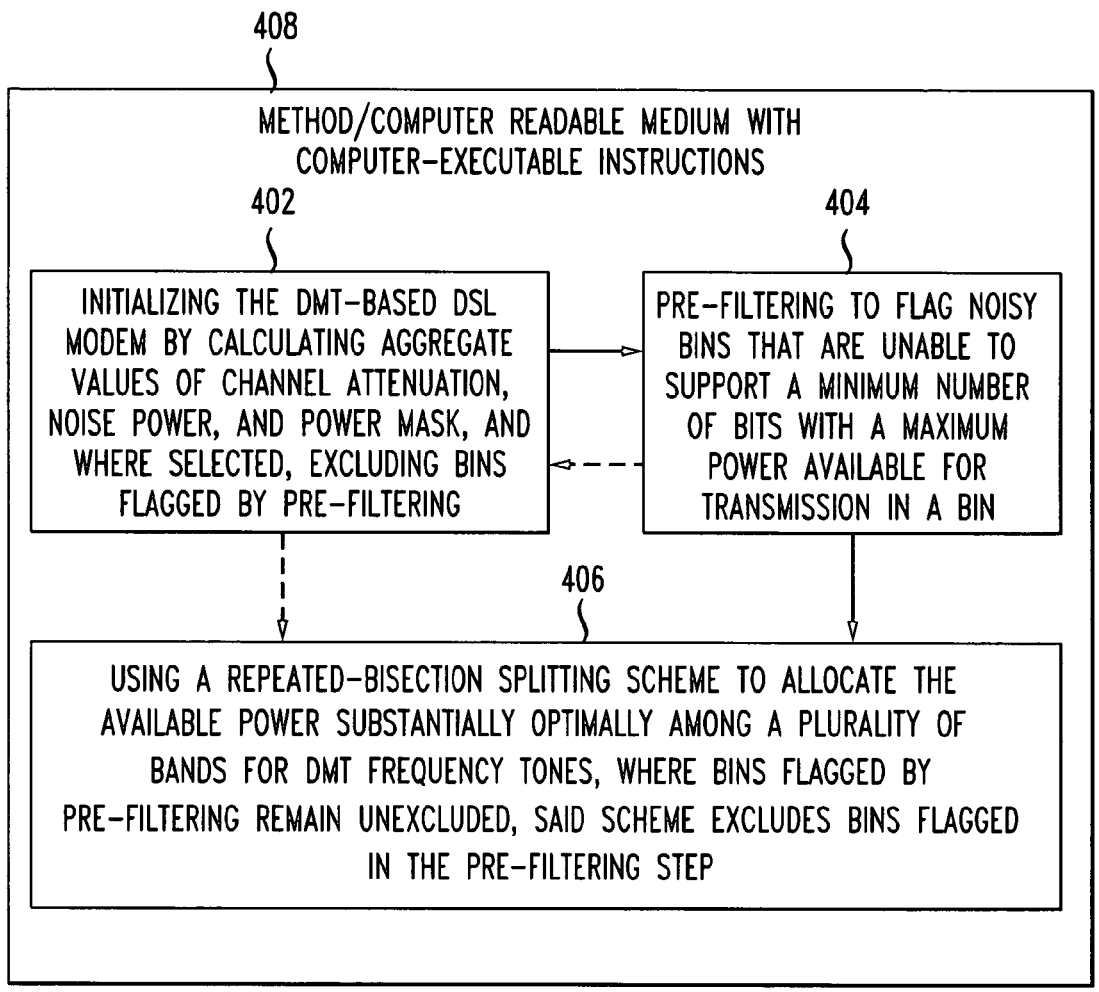

POWER ALLOCATION SCHEME FOR DMT-BASED MODEMS EMPLOYING SIMPLEX TRANSMISSION

FIELD OF THE INVENTION

The present invention relates generally to simplex transmission of signals in a multicarrier-based modem system, and more particularly to a method and system for allocating information bits when the power needs to be assigned for Discrete Multi-Tone (DMT) transmission.

BACKGROUND OF THE INVENTION

Digital Subscriber Line (DSL) technology greatly increases the digital capacity of an ordinary telephone line, allowing much more information to be channeled into a home or office. The speed that a DSL modem can achieve is based on the distance between the home or office and the central office. Symmetric DSL (SDSL) utilizes a single twisted pair and is typically used for short connections that need high speed in both directions. High Bit Rate DSL (HDSL) is a symmetric technology that uses two cable pairs and may achieve usable transmission to 12,000 feet. Each twisted pair may be used to provide T1 transmission, but the lines may not be shared with analog phones. HDSL-2 needs only one cable pair and supports a distance of 18,000 feet. SDSL utilizes only one cable pair and may be used with adaptive rates from 144 Kbps to 1.5 Mbps. The DSL technology provides "always-on" operation.

Asymmetric DSL (ADSL), which uses frequencies that are higher than voice, shares telephone lines and may be used to access the Internet. For ADSL, a Plain Old Telephone System (POTS) splitter generally must be installed at the user end to separate the voice frequencies and the ADSL frequencies. The G.lite version of ADSL, also known as the ADSL lite, Universal ADSL or splitterless ADSL, gets around the splitter requirement by having all phones plug into low-pass filters that remove the ADSL high frequencies from the voice transmissions. ADSL is available in two modulation schemes: the Discrete Multi-tone (DMT) or Carrierless Amplitude Phase (CAP).

In DMT-based DSL modems, the selected bandwidth of 1.104 MHz is divided into bins and the data bits are used for Quadrature Amplitude Modulation in each bin. During the initialization period, a channel SNR estimation phase is employed to transmit a known pseudo-random noise (PRN) sequence while the receiver computes the channel characteristics from the received signal. The characteristics are computed in the form of a $g_k \cdot N_k^{-1}$ ratio, where $g_k$ is the channel gain (attenuation, $|H(k)|^2$) in frequency band k, and $N_k$ is the noise power in band k. Prior art has disclosed a number of algorithms for determining the power distribution across the full frequency bandwidth for maximum data rate. The optimum approach for Additive White Gaussian Noise (AWGN), has been proved to be a 'water pouring' algorithm of power distribution, where the $g_k \cdot N_k^{-1}$ profile is considered to be equivalent to the 'terrain' and the available power budget is likened to 'water that is poured' on the terrain. In this analogy, the water depth at position k is equivalent to the power allocated to the frequency bin k.

The following analysis provides a brief description of this approach. As is known to those skilled in the art, the relationship between the number of bits in a frequency bin and the power needed to transmit that number of bits, for a specified bit error rate (BER) at the receiver for which $g_k \cdot N_k^{-1}$ is the measured channel characteristic, is given by the following expression:

$$b_k = \log_2\left[1 + \frac{3 \cdot g_k' \cdot E_k}{K \cdot (N_k)}\right] \quad k = 1 \ldots 256 \qquad \text{Eq. 1}$$

where
$b_k$=No. of bits in frequency bin k
$E_k$=Power required in bin k to transmit the $b_k$ bits $$\frac{g_k'}{N_k} =$$

Measured channel attenuation to noise power ratio in bin k
$N_k$=Noise power in bin k $$K = \left[Q^{-1}\left(\frac{P_e}{N_e}\right)\right]^2 \text{ where } 2 \leq \left[N_e = 4 \cdot \left(1 - \frac{1}{\sqrt{2^{b_k}}}\right)\right] \leq 4 \text{ for } 2 \leq b_k$$

Given the expression in Eq. 1, the power needed to transmit $b_k$ bits in bin k can be obtained by inverting the expression by ignoring the dependence of $N_e$ on $b_k$. (Prior art has shown that approximating $N_e$ by a constant between 2 and 4 has a negligible effect on the overall data capacity.)

$$E_k = \frac{KN}{3g_k'}(2^{b_k} - 1) = \frac{N}{g_k}(2^{b_k} - 1) \text{ where } g_k = \frac{3g'}{K}$$

The problem of power allocation consists of distributing the available power budget over the 256-bins so that the capacity as defined by $$\sum_{k=1}^{256} b_k$$

is maximized. The allocation must be performed within constraints of the DSL modems that are subject to a power mask constraint that limits the maximum power that may be allocated to each bin.

The solution to the 2-tone power allocation problem is known in the art. The available power is distributed optimally over two bins to maximize the 2-bin capacity of $b_1+b_2$. In order to perform the 256-bin power allocation, the prior art proposes an iterative approach to solve the "water-pouring" problem. However, such a solution for the 256-bin power allocation results in noisy bins. Thus, there is a need for a method, system and computer medium for assigning data bits to bins for simplex transmission while minimizing noise.

SUMMARY OF THE INVENTION

The present invention provides a method, apparatus, computer readable medium and modem for allocation of an available power to Discrete Multi-Tone (DMT) frequency tones in a DMT-based Digital Subscriber Line (DSL) modem. The steps typically include: (1) initializing the DMT-based DSL modem by calculating aggregate values of channel attenuation, noise power, and power mask; (2) pre-filtering to flag noisy bins that are unable to support a minimum number of bits with a maximum power available for transmission in a bin; and (3) using a repeated-bisection splitting scheme to allocate the available power substantially optimally among a plurality of bands for DMT frequency tones, where bins flagged in the pre-filtering step are excluded.

In one embodiment, the repeated-bisection splitting scheme may include the steps of: splitting the available power optimally between the lower and the upper halves of a 1.104-MHz bandwidth to form two power fractions for two substantially 552 KHz wide bands; splitting each of the two power fractions substantially optimally between two halves of each of the substantially 552 KHz wide bands to form four power fractions for four substantially 276 KHz wide bands; splitting each of the four power fractions optimally between two halves of each of the four substantially 276 KHz wide bands to form eight power fractions for eight substantially 138 KHz wide bands; splitting each of the eight power fractions optimally between two halves of each of the eight substantially 138 KHz wide bands to form sixteen power fractions for sixteen substantially 69 KHz wide bands; splitting each of the sixteen power fractions optimally between two halves of each of the sixteen substantially 69 KHz wide bands to form thirty-two power fractions for thirty-two substantially 34.5 KHz wide bands; splitting each of the thirty-two power fractions optimally between two halves of each of the thirty-two substantially 34.5 KHz wide bands to form sixty-four power fractions for sixty-four substantially 17.25 KHz wide bands; splitting each of the sixty-four power fractions optimally between two halves of each of the sixty-four 17.25 KHz wide bands to form one hundred twenty eight power fractions for one hundred twenty eight substantially 8.625 KHz wide bands; and splitting each of the one hundred twenty eight power fractions optimally between two halves of each of the one hundred twenty eight, 8.625 KHz wide bands to form two hundred fifty six power fractions to form two hundred fifty six substantially 4.3125 KHz wide bands.

The initializing step may include calculating aggregate parameters needed for the splitting steps while excluding bins flagged in the pre-filtering step.

Each of $2^j$ elements of a noise power vector to be used at step-j may be calculated as a sum of noise power values in bins aggregated for the step-j, where j=1, ..., 8. Each of $2^j$ elements of a channel attenuation vector that is to be used at step-j may be calculated as an average of channel attenuation values in bins aggregated for step-j, where j=1, ..., 8. Each of $2^j$ elements of a power mask vector that is to be used at step-j may be calculated as a sum of power mask values in bins aggregated for step-j, where j=1, ..., 8.

The available power may be allocated to $2^n$ tones where n is a preselected integer. Here, initializing includes calculating aggregate parameter values of channel attenuation, noise power, and power mask for n subsequent steps.

The apparatus of the present invention allocates the available power budget to a plurality of Discrete Multi-Tone (DMT) frequency tones using a repeated-bisection of power scheme to partition the available power over the plurality of DMT frequency tones in a DMT-based Digital Subscriber Line (DSL) modem. The apparatus includes an initialization unit, a pre-filtering unit, and a repeated-bisection power splitting and allocation unit. The initialization unit initializes the DMT-based DSL modem by calculating aggregate parameter values of channel attenuation, noise power, and power mask. The pre-filtering unit is coupled to the initialization unit and is used for pre-filtering to flag noisy bins that are unable to support a minimum number of bits with a maximum power available for transmission in a bin. The pre-filtering step is utilized to ensure that narrow-band energy from radio sources, power lines, and other line-spectrum-producing interferers does not distort the power-allocation process by "wasting" power in bins which overlay these interferers. The repeated-bisection power splitting and allocation unit is coupled to the pre-filtering unit and is used for implementing the repeated bisection of power scheme of the invention to allocate available power substantially optimally among a plurality of bands for DMT frequency tones, where bins flagged by the pre-filtering unit are excluded. Where desired, the initialization unit may receive notification of the flagged noisy bins from the pre-filtering unit and exclude the flagged noisy bins.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 3 is a block diagram of a modem having an apparatus for allocation of an available power to Discrete Multi-Tone frequency tones in a Discrete Multi-Tone frequency-based Digital Subscriber Line in accordance with the present invention.

FIG. 4 is a flow chart showing two embodiments of steps in accordance with the method of the present invention.

DETAILED DESCRIPTION OF THE PREFERRED EMBODIMENTS

The present invention utilizes a "repeated-bisection" scheme to extend the 2-bin solution to 256-bins instead of using the iterative scheme suggested in the prior art. The prior art considers the simple case in which the power is to be distributed over two bins. The two-bin capacity, $b_1+b_2$ is maximized with respect to the power to be allocated to bin-1 as $(E_r)$, when the power is E and the power to be allocated to bin-2 is $E-E_r$. It can be shown that the optimum power allocation to bin 1 is given by the following expression.

$$E_r = \frac{1}{2}(E + N_2 \cdot g_2^{-1} - N_1 \cdot g_1^{-1}) \qquad \text{Eq. 2}$$

This solution is derived for the two-tone simplex transmission. It is also the water-filling solution, e.g., if the noise power and attenuation coefficients in the two bins are equal, the two terms cancel each other and the power is divided equally between the two bins. Similarly, the smaller the ratio of noise power to attenuation coefficient is in bin 1, the larger the value of $E_r$ is, which in turn, allocates greater power to bin 1. The above expression may be simplified by denoting $M_1 = N_i \cdot g_i^{-1}$ for $i=1,2$ and $t_{21} = M_2^{-1} - M_1^{-1}$:

$$E_r = 0.5 \cdot (E + t_{21}) \text{ and } E - E_r = 0.5 \cdot (E - t_2) = 0.5 \cdot (E + t_{12}) \qquad \text{Eq. 3}$$

Figure 2:
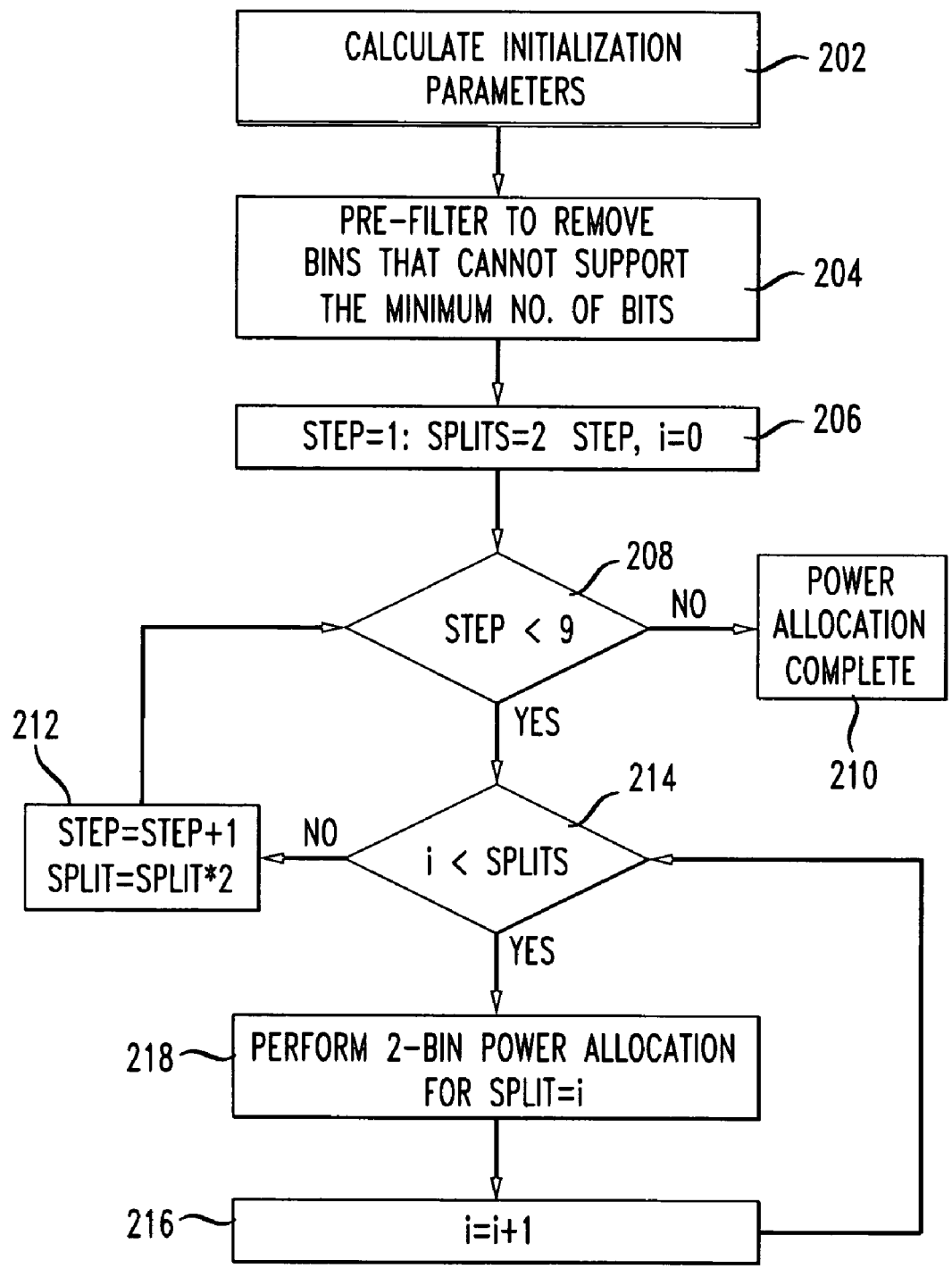
FIG. 2 is a flow diagram of one embodiment of steps in accordance with the method of the present invention.

Discrete Multi-tone-based Digital Subscriber Loop (DSL) modems require a scheme for allocating bits and power to the discrete tones during the initialization period. As shown in FIG. 2, the initialization parameters are computed 202, and pre-filtering is used to remove bins that cannot support the minimum number of bits 204. Then the repeated-bisection splitting scheme of the present invention partitions available power over all the frequency bins to which power needs to be assigned for DMT-transmission 206, 208, 210, 210, 212, 214, 216, 218. The power allocation is performed with the objective of maximizing the total data rate.

Extension to Multi-Bins

In the present invention, a repeated bisection scheme is used for extending the two-tone solution to the 256-tone case. The scheme operates by first bisecting the 1.104 MHz band into halves to solve the first '2-tone' problem. In the second split, two problems, each a different 2-tone problem, are solved. In split 3, four problems, each a different 2-tone problem, are solved. This process of progressively splitting each band in halves is continued for 8 splits, until power is allocated to each of the 256 bins. The repeated bisection scheme 206, 208, 210, 210, 212, 214, 216, 218 is shown schematically in FIGS. 1 and 2. The number of bands that are produced as a result of split-i is equal to $2^i$ and the bandwidth of each band at split-i is equal to $$\frac{1104}{2^i} \text{ KHz}.$$

Figure 1:
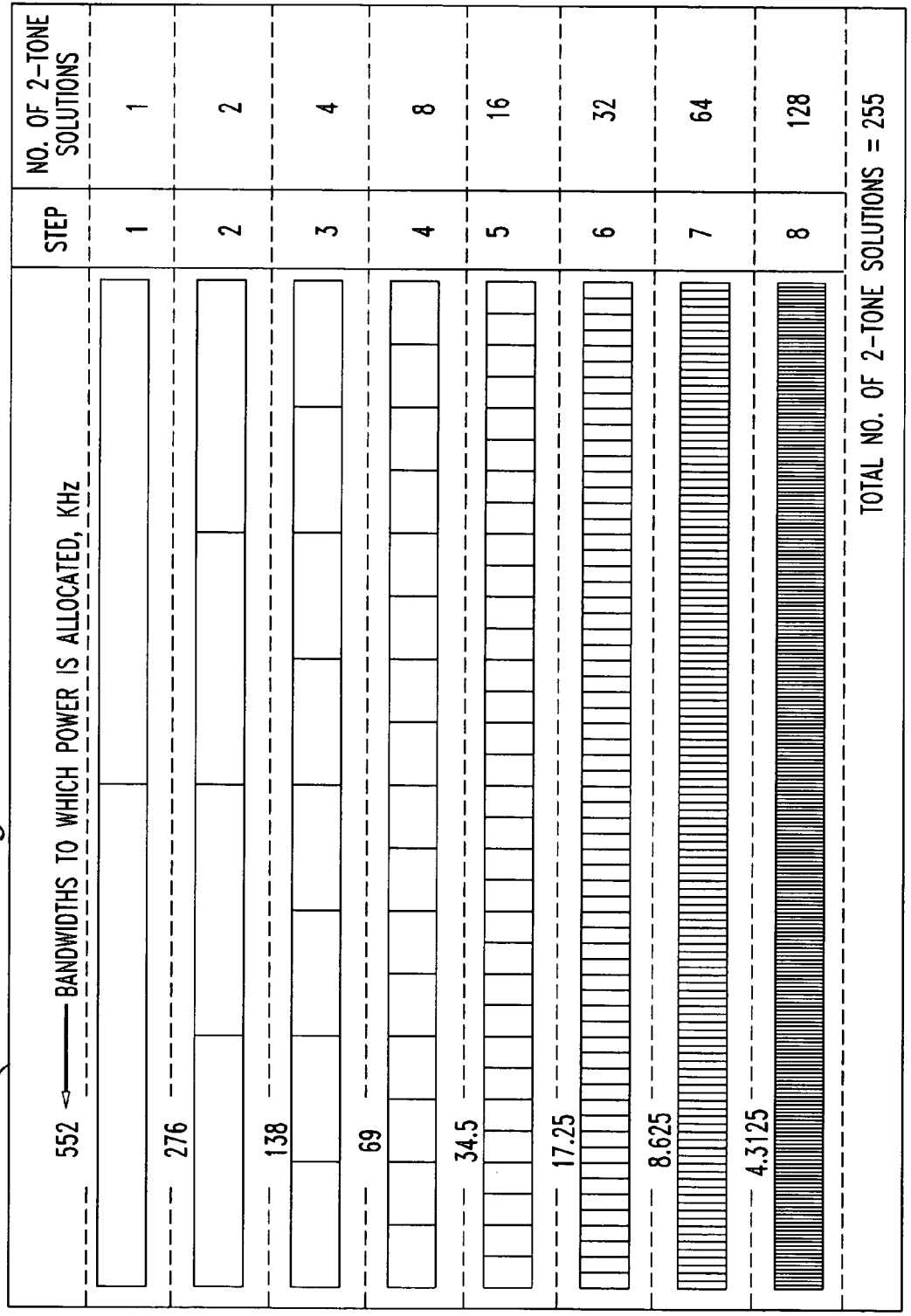
FIG. 1 is a schematic representation of steps, splits and frequency bands in a multi-tone power splitting scheme in accordance with the present invention.

Thus, at split 1, each band is 552 KHz wide and at the $8^{th}$ split, each band corresponds to the DMT frequency bin. FIG. 1 also shows the number of 2-tone solutions that must be computed at each split. At split-1, one 2-tone solution generates the partition of the budgeted power over each of two 552 KHz frequency bands. Each of these two power fractions is split into two parts in split-2 to yield power allocations to four 276 KHz frequency bands. FIG. 1 shows that the maximum number of 2-tone solutions that may have to be computed is equal to 255. The following explains the procedure for calculating the values of the channel attenuation and noise PSD profiles at each split.

Pre-Filtering to Eliminate Noisy Bins

In a pre-filtering step, the invention provides for calculating the number of bits that can be received in a bin with the desired bit error rate (BER), when the tone is transmitted with a power level that is equal to that specified by the power mask value at the frequency bin. If the calculated value is less than the minimum number of bits that can be allocated to that bin, then the bin is flagged for exclusion from the subsequent power allocation steps.

Input Power at each Split

In the first split, the power budgets allocated are allocated to the two halves. For example, the 0.1-Watt budgeted power would be split between the upper and the lower halves of the entire 1.104 MHz band.

In the second split, the input power to each of the two portions would be the partial power allocated to the corresponding half-band in split 1. For example, if 75 mWatt is assigned to the lower half-band and the rest of the 25 mWatts is allocated to the upper half-band, then the power inputs to the two 2-tone portions is 75 and 25 mWatts, respectively.

In the third split, the power input to each of the four portions is the partial power allocated to the corresponding quarter-band in split 2.

As shown in FIG. 1, step-8 consists of performing 128 solutions of the 2-bin allocation portions. Thus, split 8 is the only part of the scheme that uses the normal DMT bins. All of the earlier 7 steps require system parameters for progressively wider frequency bands. In fact, the 'tone' to which power is allocated in step-i ($i=1 \ldots 8$) is of a bandwidth that corresponds to that of $2^{8-i}$ frequency bins. Hence, the appropriate channel parameters must be calculated for each step.

No. of 2-tone solutions at step-i=$2^{i-1}$
No. of frequency bands produced at step i=$2^i$
j $\triangle$ Band Index at step-i=$1 \ldots 2^i$ Noise Power at each Split Noise power in band index j should be the total noise power in that band. If $N_k$ represents the noise power in bin k ($k=1 \ldots 256$), then the noise power in band j at step i may be calculated as follows and stored for use in the 7-steps of the band-splitting scheme. The calculation of the integrated noise power values needs to be performed just once, and it adds 254-array elements to the storage requirement. Note that the summations for average noise calculation are performed over only those bins that can support at least the minimum number of bits with the maximum power that can be allocated to one bin as determined in the pre-filtering step above.

$$N(i, j) = \sum_{k \in band_j} N_k \text{ where, } k = 1 \ldots 2^i \qquad \text{Eq. 4}$$

Channel Attenuation Parameters at each Split

The channel attenuation coefficient in bin-k in each band, $g_k$, is the average value for the band. The summations for the calculation of average channel attenuation are performed over only those bins that were not excluded by the pre-filtering step.

$$g(i, j) = \frac{1}{2^{8-i}} \cdot \left( \sum_{k \in band_j} g_k \right) \text{ where } j = 1 \ldots 2^i \qquad \text{Eq. 5}$$

Power Mask Constraint at each Split

The power mask constraint may be applied by calculating the implied mask constraint for each of the wider bands used in splits 1 through 7. Power mask in band index j should be the total power mask in that band. If $Pmask_k$ represent the power mask values in bin k ($k=1 \ldots 256$), then the power mask in band j at step i can be calculated and stored for use in the 7-steps of the band-splitting scheme. The calculation of the integrated power mask values needs to be performed just once, and it adds 254-array elements to the storage requirement. The ADSL parameters are such that the total integrated power mask exceeds the power budget. Hence, a signal is not intended to be as large as to reach the power mask at all the frequencies. Therefore, the integrated values of the power mask for the wider bins are compared with the total power budget and the integrated power mask is set as the minimum of the integrated value and the total power budget.

$$Pmask(i,\ j) = \min\left(\sum_{k \in band_j} Pmask_k,\ P_{budget}\right) \text{ where } j = 1 \ldots 2^i$$

FIG. 3 is a block diagram of a modem 302 having an apparatus 304 for allocating an available power to a plurality of Discrete Multi-Tone (DMT) frequency tones using a repeated-bisection of power scheme to partition the available power over the plurality of DMT frequency tones in a DMT-based Digital Subscriber Line (DSL) in accordance with the present invention. The apparatus 304 includes an initialization unit 306, a pre-filtering unit 308 and a repeated-bisection power splitting and allocation unit 310. The initialization unit 304 is used for initializing the DMT-based DSL modem by calculating aggregate parameter values of channel attenuation, noise power, and power mask. The pre-filtering unit 308 is coupled to the initialization unit 306 and is used for pre-filtering to flag noisy bins that are unable to support a minimum number of bits with a maximum power available for transmission in a bin. The repeated-bisection power splitting and allocation unit 310 is coupled to the pre-filtering unit 308 and is utilized for using the repeated-bisection of power scheme to allocate the available power substantially optimally among a plurality of bands for DMT frequency tones. As shown by the solid lines, the available power may be sent to the initialization unit 306, which sends its output to the pre-filtering unit 308, which sends its output to the repeated-bisection power splitting and allocation unit 310. The actions taken in the units are as described below in the corresponding method steps.

In one embodiment, the repeated-bisection splitting unit 310 may implement the repeated-bisection of power scheme by: splitting the available power optimally between the lower and the upper halves of a 1.104-MHz bandwidth to form two power fractions for two substantially 552 KHz wide bands; splitting each of the two power fractions substantially optimally between two halves of each of the substantially 552 KHz wide bands to form four power fractions for four substantially 276 KHz wide bands; splitting each of the four power fractions optimally between two halves of each of the four substantially 276 KHz wide bands to form eight power fractions for eight substantially 138 KHz wide bands; splitting each of the eight power fractions optimally between two halves of each of the eight substantially 138 KHz wide bands to form sixteen power fractions for sixteen substantially 69 KHz wide bands; splitting each of the sixteen power fractions optimally between two halves of each of the sixteen substantially 69 KHz wide bands to form thirty-two power fractions for thirty-two substantially 34.5 KHz wide bands; splitting each of the thirty-two power fractions optimally between two halves of each of the thirty-two substantially 34.5 KHz wide bands to form sixty-four power fractions for sixty-four substantially 17.25 KHz wide bands; splitting each of the sixty-four power fractions optimally between two halves of each of the sixty-four 17.25 KHz wide bands to form one hundred twenty eight power fractions for one hundred twenty eight substantially 8.625 KHz wide bands; and splitting each of the one hundred twenty eight power fractions optimally between two halves of each of the one hundred twenty eight, 8.625 KHz wide bands to form two hundred fifty six power fractions to form two hundred fifty six substantially 4.3125 KHz wide bands.

Alternatively, the available power may be sent to the pre-filtering unit 308 first, whose output is sent to the initialization unit 306, and the output of the initialization unit may be sent to the repeated-bisection power splitting and allocation unit 310. In this embodiment, the initialization unit 306 is coupled to the pre-filtering unit 308 which receives the available power, such that the initialization unit 306 receives notification of the bins that are flagged, and then calculates aggregate parameter values needed to implement the repeated-bisection of power scheme and excludes bins flagged by the pre-filtering unit.

In one embodiment, each of $2^j$ elements of a noise power vector to be used at step-j of the repeated-bisection of power scheme may be calculated as a sum of noise power values in bins aggregated for the step-j, where j=1, . . . ,8. Similarly, each of $2^j$ elements of a channel attenuation vector that is to be used at step-j of the repeated-bisection of power scheme may be calculated as an average of channel attenuation values in bins aggregated for step-j, where j= 1, . . . ,8. Also, each of $2^j$ elements of a power mask vector that is to be used at step-j of the repeated-bisection of power scheme may be calculated as a sum of power mask values in bins aggregated for step-j, where j=1, . . . ,8.

The available power may be selected to be allocated to $2^n$ tones where n is a preselected integer. Typically, in this embodiment, the initialization unit 306 initializes the modem by calculating aggregate parameter values of channel attenuation, noise power, and power mask for n subsequent steps.

FIG. 4 shows a method for allocation of an available power to Discrete Multi-Tone (DMT) frequency tones in a DMT-based Digital Subscriber Line (DSL) modem in accordance with the present invention. The method typically includes the steps of: initializing 402 the DMT-based DSL modem by calculating aggregate values of channel attenuation, noise power, and power mask; pre-filtering 404 to flag noisy bins that are unable to support a minimum number of bits with a maximum power available for transmission in a bin; and using a repeated-bisection splitting scheme 406 to allocate the available power substantially optimally among a plurality of bands for DMT frequency tones, wherein, where bins flagged in the pre-filtering process and not yet excluded are excluded by the scheme.

The method may implement the repeated-bisection splitting scheme by: splitting the available power optimally between the lower and the upper halves of a 1.104-MHz bandwidth to form two power fractions for two substantially 552 KHz wide bands; splitting each of the two power fractions substantially optimally between two halves of each of the substantially 552 KHz wide bands to form four power fractions for four substantially 276 KHz wide bands; splitting each of the four power fractions optimally between two halves of each of the four substantially 276 KHz wide bands to form eight power fractions for eight substantially 138 KHz wide bands; splitting each of the eight power fractions optimally between two halves of each of the eight substantially 138 KHz wide bands to form sixteen power fractions for sixteen substantially 69 KHz wide bands; splitting each of the sixteen power fractions optimally between two halves of each of the sixteen substantially 69 KHz wide bands to form thirty-two power fractions for thirty-two substantially 34.5 KHz wide bands; splitting each of the thirty-two power fractions optimally between two halves of each of the thirty-two substantially 34.5 KHz wide bands to form sixty-four power fractions for sixty-four substantially 17.25 KHz wide bands; splitting each of the sixty-four power fractions optimally between two halves of each of the sixty-four 17.25 KHz wide bands to form one hundred twenty eight power fractions for one hundred twenty eight substantially 8.625 KHz wide bands; and splitting each of the one hundred twenty eight power fractions optimally between two halves of each of the one hundred twenty eight, 8.625 KHz wide bands to form two hundred fifty six power fractions to form two hundred fifty six substantially 4.3125 KHz wide bands.

Where the pre-filtering step 404 precedes the initializing step 402 (dashed lines), the initializing step 402 may provide for calculating aggregate parameters needed while excluding noisy bins that are flagged as unable to support a minimum number of bits with a maximum power available for transmission in a bin.

Each of $2^j$ elements of a noise power vector to be used at step-j may be calculated as a sum of noise power values in bins aggregated for the step-j, where j=1, . . . ,8. Also, each of $2^j$ elements of a channel attenuation vector that is to be used at step-j may be calculated as an average of channel attenuation values in bins aggregated for step-j, where j=1, . . . ,8. In addition, each of $2^j$ elements of a power mask vector that is to be used at step-j may be calculated as a sum of power mask values in bins aggregated for step-j, where j=1, . . . ,8.

Generally, the available power is allocated to $2^n$ tones where n is a preselected integer. Initializing typically includes calculating aggregate parameter values of channel attenuation, noise power, and power mask for n subsequent steps.

Clearly, the method of the invention may be implemented by digital signal processor, a microprocessor, a general processor, or other circuitry arranged to implement the steps of the method.

The present invention may be implemented by a computer readable medium such as, for example, a memory, computer disk, or the like, having computer-executable instructions for allocation of an available power to Discrete Multi-Tone (DMT) frequency tones in a DMT-based Digital Subscriber Line (DSL) modem, wherein the computer-executable instructions include the steps of: initializing the modem by calculating aggregate values of channel attenuation, noise power, and power mask; pre-filtering to flag noisy bins that are unable to support a minimum number of bits with a maximum power available for transmission in a bin; and using a repeated-bisection splitting scheme to allocate the available power substantially optimally among a plurality of bands for DMT frequency tones. The exclusion of the flagged bins may be accomplished in the initializing step or, alternatively, in the step of using the repeated-bisection splitting scheme. Where desired, the repeated-bisection splitting scheme may include the steps enumerated above.

Each of $2^j$ elements of a noise power vector to be used at step-j of the repeated-bisection splitting scheme may be calculated as a sum of noise power values in bins aggregated for the step-j, where j=1, . . . ,8. Similarly, each of $2^j$ elements of a channel attenuation vector that is to be used at step-j of the repeated-bisection splitting scheme may be calculated as an average of channel attenuation values in bins aggregated for step-j, where j=1, . . . ,8. Also, each of $2^j$ elements of a power mask vector that is to be used at step-j of the repeated-bisection splitting scheme may be calculated as a sum of power mask values in bins aggregated for step-j, where j=1, . . . ,8. The available power is generally allocated to $2^n$ tones where n is a preselected integer. Initializing typically includes calculating aggregate parameter values of channel attenuation, noise power, and power mask for n subsequent steps.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for allocation of an available power budget to Discrete Multi-Tone (DMT) frequency tones, wherein each of said tones corresponds to a bin of a plurality of bins, each of said bins in said plurality representing a portion of a predetermined bandwidth, said method comprising the steps of:

calculating for each of said bins aggregate values of channel attenuation, noise power, and power mask;

pre-filtering to flag, as a function of at least one of said channel attenuation, noise power and power mask, bins that are unable to support a minimum number of bits with a maximum power available for transmission in a bin; and using a repeated-bisection splitting scheme to allocate the available power substantially optimally among said plurality of bins, wherein at least a first flagged bin in said plurality of bins is excluded from being allocated power.

2. The method of claim 1 wherein the repeated-bisection splitting scheme includes the steps of:

splitting the available power optimally between the lower and the upper halves of a 1.104-MHz bandwidth to form two power fractions for two substantially 552 KHz wide bands;

splitting each of the two power fractions substantially optimally between two halves of each of the substantially 552 KHz wide bands to form four power fractions for four substantially 276 KHz wide bands;

splitting each of the four power fractions optimally between two halves of each of the four substantially 276 KHz wide bands to form eight power fractions for eight substantially 138 KHz wide bands;

splitting each of the eight power fractions optimally between two halves of each of the eight substantially 138 KHz wide bands to form sixteen power fractions for sixteen substantially 69 KHz wide bands;

splitting each of the sixteen power fractions optimally between two halves of each of the sixteen substantially 69 KHz wide bands to form thirty-two power fractions for thirty-two substantially 34.5 KHz wide bands;

splitting each of the thirty-two power fractions optimally between two halves of each of the thirty-two substantially 34.5 KHz wide bands to form sixty-four power fractions for sixty-four substantially 17.25 KHz wide bands;

splitting each of the sixty-four power fractions optimally between two halves of each of the sixty-four 17.25 KHz wide bands to form one hundred twenty eight power fractions for one hundred twenty eight substantially 8.625 KHz wide bands; and splitting each of the one hundred twenty eight power fractions optimally between two halves of each of the one hundred twenty eight, 8.625 KHz wide bands to form two hundred fifty six power fractions to form two hundred fifty six substantially 4.3125 KHz wide bands.

3. The method of claim 2 wherein the step of initializing comprises calculating said aggregate parameters while excluding noisy bins that are flagged as unable to support a minimum number of bits with a maximum power available for transmission in a bin.

4. The method of claim 3 wherein each of $2^j$ elements of a noise power vector to be used at step-j is calculated as a sum of noise power values in bins aggregated for the step-j, where j=1, . . . ,8.

5. The method of claim 3 wherein each of the $2^j$ elements of a channel attenuation vector that is to be used at step-j is calculated as an average of channel attenuation values in bins aggregated for step-j, where j=1, . . . ,8.

6. The method of claim 3 wherein each of $2^j$ elements of a power mask vector that is to be used at step-j is calculated as a sum of power mask values in bins aggregated for step-j, where j=1, . . . ,8.

7. The method of claim 1 wherein the available power is allocated to $2^n$ tones where n is a preselected integer.

8. The method of claim 7 wherein initializing includes calculating aggregate parameter values of channel attenuation, noise power, and power mask for n subsequent steps.

9. An apparatus for allocating an available power to a plurality of Discrete Multi-Tone (DMT) frequency tones using a repeated-bisection of power scheme to partition the available power over the plurality of DMT frequency tones, wherein each of said tones corresponds to a bin of a plurality of bins, each of said bins in said plurality representing a portion of a predetermined bandwidth, said apparatus comprising:
an initialization unit, for calculating for each of said bins an aggregate parameter values of channel attenuation, noise power, and power mask;
a pre-filtering unit, coupled to the initialization unit, for pre-filtering to flag, as a function of at least one of said channel attenuation, noise power and power mask, bins that are unable to support a minimum number of bits with a maximum power available for transmission in a bin; and
a repeated-bisection power splitting and allocation unit, coupled to the pre-filtering unit, for using the repeated-bisection of power scheme to allocate available power substantially optimally among said plurality of bins.

10. The apparatus of claim 9 wherein the repeated-bisection splitting unit implements the repeated-bisection of power scheme by:
splitting the available power optimally between the lower and the upper halves of a 1.104-MHZ bandwidth to form two power fraction for two substantially 552 KHz wide bands;
splitting each of the two power fractions substantially optimally between two halves of each of the substantially 552 KHz wide bands to form four power fractions for four substantially 276 KHz wide bands;
splitting each of the four power fractions optimally between two halves of each of the four substantially 276 KHz wide bands to form eight power fractions for eight substantially 138 KHz wide bands;
splitting each of the eight power fractions optimally between two halves of each of the eight substantially 138 KHz wide bands to form sixteen power fractions for sixteen substantially 69 KHz wide bands;
splitting each of the sixteen power fractions optimally between two halves of each of the sixteen substantially 69 KHz wide bands to form thirty-two power fractions for thirty-two substantially 45.5 KHz wide bands;
splitting each of the thirty-two power fractions optimally between two halves of each of the thirty-two substantially 34.5 KHz wide bands to form sixty-four power fractions for sixty-four substantially 17.25 KHz wide bands;
splitting each of the sixty-four power fractions optimally between two halves of each of the sixty-four 17.25 KHz wide bands to form one hundred twenty eight power fractions for one hundred twenty eight substantially 8.625 KHZ wide bands; and
splitting each of the one hundred twenty eight power fractions optimally between two halves of each of the one hundred twenty eight, 8.625 KHz wide bands to form two hundred fifty six power fractions to form two hundred fifty six substantially 4.3125 KHz wide bands.

11. The apparatus of claim 9 wherein the initialization unit is further coupled to the pre-filtering unit to receive notification of the bins that are flagged, calculates aggregate parameter values needed to implement the repeated-bisection of power scheme and excludes bins flagged by the pre-filtering unit.

12. The apparatus of claim 9 where each of $2^j$ elements of a noise power vector to be used at step-j of the repeated-bisection of power scheme is calculated as a sum of noise power values in bins aggregated for the step-j, where j=1, . . . ,8.

13. The apparatus of claim 9 wherein each of $2^j$ elements of a channel attenuation vector that is to be used at step-j of the repeated-bisection of power scheme is calculated as an average of channel attenuation values in bins aggregated for step-j, where j=1, . . . ,8.

14. The apparatus of claim 9 wherein each of $2^j$ elements of a power mask vector that is to be used at step-j of the repeated-bisection of power scheme is calculated as a sum of power mask values in bins aggregated for step-j, where j=1, . . . ,8.

15. The apparatus of claim 9 wherein the available power is allocated to $2^n$ tones where n is a preselected integer.

16. The apparatus of claim 9 wherein the initialization unit initializes the modem by calculating aggregate parameter values of channel attenuation, noise power, and power mask for n subsequent steps.

17. Computer readable medium having computer-executable instructions for allocation of an available power to Discrete Multi-Tone (DMT) frequency tones, wherein each of said tones corresponds to a bin of a plurality of bins, each of said bins in said plurality representing a portion of a predetermined bandwidth, further wherein the computer-executable instructions comprise the steps of:
calculating for each of said bins aggregate values of channel attenuation, noise power, and power mask;
pre-filtering to flag, as a function of at least one of said channel attenuation, noise power and power mask, bins that are unable to support a minimum number of bits with a maximum power available for transmission in a bin; and
using a repeated-bisection splitting scheme to allocate the available power substantially optimally among said plurality of bins.

18. The computer readable medium of claim 17 wherein the repeated-bisection splitting scheme includes the steps of:
splitting the available power optimally between the lower and the upper halves of a 1.104 MHZ bandwidth to form two power fractions for two substantially 552 KHz wide bands;

splitting each of the two power fractions substantially optimally between two halves of each of the substantially 552 KHz wide bands to form four power fractions for four substantially 276 KHz wide bands;

splitting each of the four power fractions optimally between two halves of each of the four substantially 276 KHz wide bands to form eight power fractions for eight substantially 138 KHz wide bands;

splitting each of the eight power fractions optimally between two halves of each of the eight substantially 138 KHz wide bands to form sixteen power fractions for sixteen substantially 69 KHz wide bands;

splitting each of the sixteen power fractions optimally between two halves of each of the sixteen substantially 69 KHz wide bands to form thirty-two power fractions for thirty-two substantially 34.5 KHz wide bands;

splitting each of the thirty-two power fractions optimally between two halves of each of the thirty-two substantially 34.5 KHz wide bands to form sixty-four power fractions for sixty-four substantially 17.25 KHz wide bands;

splitting each of the sixty-four power fractions optimally between two halves of each of the sixty-four 17.25 KHz wide bands to form one hundred twenty eight power fractions for one hundred twenty eight substantially 8.625 KHz wide bands; and splitting each of the one hundred twenty eight power fractions optimally between two halves of each of the one hundred twenty eight, 8.625 KHz wide bands to form two hundred fifty six fractions for two hundred fifty six substantially 4.3125 KHz wide bands.

19. The computer readable medium of claim 18 wherein the computer-executable step of initializing includes calculating, for bins unexcluded by pre-filtering flagging, aggregate parameter values.

20. The computer readable medium of claim 17 wherein each of $2^j$ elements of a noise power vector to be used at step-j of the repeated-bisection splitting scheme is calculated as a sum of noise power values in bins aggregated for the step-j, where j=1, . . . ,8.

21. The computer readable medium of claim 17 wherein each of $2^j$ elements of a channel attenuation vector that is to be used at step-j of the repeated-bisection splitting scheme is calculated as an average of channel attenuation values in bins aggregated for step-j, where j=1, . . . ,8.

22. The computer readable medium of claim 17 wherein each of $2^j$ elements of a power mask vector that is to be used at step-j of the repeated-bisection scheme is calculated as a sum of power mask values in bins aggregated for step-j, where j=1, . . . ,8.

23. The computer readable medium of claim 17 wherein the available power is allocated to $2^n$ tones where n is a preselected integer.

24. The computer readable medium of claim 17 wherein initializing includes calculating aggregate parameter values of channel attenuation, noise power, and power mask for n subsequent steps.

25. A modem having an apparatus for allocating an available power to a plurality of Discrete Multi-Tone (DMT) frequency tones using a repeated-bisection of power scheme to partition the available power over the plurality of DMT frequency tones, wherein each of said tones corresponds to a bin of a plurality of bins each of said bins in said plurality representing a portion of a predetermined bandwidth, the apparatus comprising:

an initialization unit, for calculating for each of said bins an aggregate parameter values of channel attenuation, noise power, and power mask;

a pre-filtering unit, coupled to the initialization unit, for pre-filtering to flag, as a function of at least one of said channel attenuation noise power and power mask, bins that are unable to support a minimum number of bits with a maximum power available for transmission in a bin; and a repeated-bisection power splitting and allocation unit, coupled to the pre-filtering unit, for using the repeated-bisection of power scheme to allocate available power substantially optimally among said plurality of bins.

* * * * *